United States Patent [19]
Conatser

[11] Patent Number: 5,639,219
[45] Date of Patent: Jun. 17, 1997

[54] AIRLESS PAINT SPRAYER INTAKE DAMPENER AND INLET VALVE SPRING

[75] Inventor: Roger Conatser, Franklin, Tenn.

[73] Assignee: Campbell Hausfeld/Scott Fetzer Co., Westlake, Ohio

[21] Appl. No.: 370,159

[22] Filed: Jan. 9, 1995

[51] Int. Cl.⁶ .............. F04B 23/02; F04B 53/10; B05B 9/04
[52] U.S. Cl. .............. 417/53; 417/543; 239/332; 137/541
[58] Field of Search .................. 417/542, 543, 417/569, 53; 239/332, 146, 147; 137/529, 541

[56] References Cited

U.S. PATENT DOCUMENTS

| | | |
|---|---|---|
| 57,412 | 8/1866 | Vander Weyde .............. 417/542 |
| 370,896 | 10/1887 | Schuehle . |
| 587,704 | 8/1897 | Clayton . |
| 716,864 | 12/1902 | Casey et al. . |
| 731,218 | 6/1903 | Perkins . |
| 754,162 | 3/1904 | Reynolds . |
| 827,522 | 7/1906 | Felsberg . |
| 919,036 | 4/1909 | Langer . |
| 1,169,587 | 1/1916 | Wold . |
| 1,272,212 | 7/1918 | Callan . |
| 1,360,504 | 11/1920 | Crowther . |
| 1,519,856 | 12/1924 | Lorraine . |
| 1,592,373 | 7/1926 | Lovejoy . |
| 1,737,706 | 12/1929 | Collins .............. 137/529 X |
| 1,739,603 | 12/1929 | McCune . |
| 1,742,755 | 1/1930 | Cataline et al. . |
| 1,768,807 | 7/1930 | Thompson . |
| 1,808,209 | 6/1931 | Earl . |
| 1,969,205 | 8/1934 | Carr et al. . |
| 2,059,706 | 11/1936 | Paasche . |
| 2,089,630 | 8/1937 | Teeter . |
| 2,100,404 | 11/1937 | Mason . |
| 2,155,098 | 4/1939 | Mohr . |
| 2,227,578 | 1/1941 | Fraser . |
| 2,266,365 | 12/1941 | Harrison et al. . |
| 2,290,788 | 7/1942 | Wilson . |
| 2,371,546 | 3/1945 | Roselund . |
| 2,418,674 | 4/1947 | Steiner . |
| 2,650,579 | 9/1953 | Bernight . |
| 2,669,245 | 2/1954 | Walker . |
| 2,679,258 | 5/1954 | Jackson . |
| 2,801,133 | 7/1957 | Ridley . |
| 2,839,076 | 6/1958 | Mueller . |
| 2,889,474 | 1/1959 | Pleuger et al. .............. 417/569 X |
| 3,001,546 | 9/1961 | Salisbury .............. 137/541 |
| 3,123,093 | 3/1964 | Akerman et al. .............. 137/529 X |
| 3,152,603 | 10/1964 | Zeisloft . |
| 3,157,191 | 11/1964 | Garrett et al. . |
| 3,158,351 | 11/1964 | Kauffman et al. . |
| 3,253,611 | 5/1966 | Cummins . |
| 3,259,308 | 7/1966 | Bennett . |
| 3,447,564 | 6/1969 | North . |
| 3,460,805 | 8/1969 | Kudlaty . |
| 3,536,094 | 10/1970 | Manley, Jr. . |
| 3,675,849 | 7/1972 | Boylan . |
| 3,679,332 | 7/1972 | Yohpe . |

(List continued on next page.)

FOREIGN PATENT DOCUMENTS

| | | |
|---|---|---|
| 1405442 | 5/1970 | France . |
| 2638812 | 5/1990 | France . |
| 9420750 | 9/1994 | WIPO . |

*Primary Examiner*—Richard E. Gluck
*Attorney, Agent, or Firm*—Wood, Herron & Evans, L.L.P.

[57] ABSTRACT

An airless paint sprayer includes an inlet check valve assembly having a dual spring configuration which allows for increased travel distance of the inlet check valve thereby increasing the fluid flow through the valve without diminishing response time of the valve or the priming operations of the system. A dampener also contributes to lessening the cavitation and loss of pressure in the paint sprayer and comprises a generally T-shaped fitting in which one leg of the T-shaped fitting is capped and includes a trapped volume of air to dampen acceleration/deceleration forces and acceleration spikes being transmitted from the pump to the fluid being pumped through the fitting.

9 Claims, 3 Drawing Sheets

U.S. PATENT DOCUMENTS

| | | |
|---|---|---|
| 3,687,154 | 8/1972 | Petersen et al. . |
| 3,698,415 | 10/1972 | Forster et al. . |
| 3,829,253 | 8/1974 | Bunn et al. . |
| 3,862,751 | 1/1975 | Schwaller . |
| 3,895,647 | 7/1975 | Willenbreck, et al. . |
| 3,914,528 | 10/1975 | Johnson . |
| 3,945,767 | 3/1976 | Rokadia . |
| 4,065,237 | 12/1977 | Webb . |
| 4,164,240 | 8/1979 | Cyphelly . |
| 4,171,712 | 10/1979 | DeForrest . |
| 4,221,437 | 9/1980 | Doerfler . |
| 4,265,267 | 5/1981 | Cyphelly . |
| 4,365,745 | 12/1982 | Beck .................................. 239/124 |
| 4,387,914 | 6/1983 | Paulson et al. . |
| 4,485,843 | 12/1984 | Wolff . |
| 4,516,553 | 5/1985 | Lindberg . |
| 4,524,947 | 6/1985 | Barnes et al. . |
| 4,852,608 | 8/1989 | Bennitt . |
| 5,174,332 | 12/1992 | Yokoyama et al. . |
| 5,215,286 | 6/1993 | Kolenc . |
| 5,261,610 | 11/1993 | Waryu et al. . |

AIRLESS PAINT SPRAYER INTAKE DAMPENER AND INLET VALVE SPRING

This application is related to an application entitled "Airless Paint Sprayer Intake Dampener" filed on Jan. 9, 1995 and accorded Ser. No. 08/370,377, assigned to the assignee of this invention, and hereby incorporated by reference.

BACKGROUND OF THE INVENTION

This invention relates to airless paint sprayers, and more particularly, to a mechanism for providing a more consistent spray of paint without a loss of pressure over a range of operating parameters.

In a typical airless paint sprayer, a piston driven diaphragm pulls the paint from a supply line into a paint holding or diaphragm chamber. A spray gun has a trigger which, when depressed, opens a valve to allow the pressurized paint in the chamber to flow to a gun nozzle and atomize as it exits a paint orifice for spraying onto a surface to be coated.

Airless paint sprayers commonly include a suction tube inserted within a can of paint through which the paint is delivered to the diaphragm chamber. Suction is created in the suction tube by a deformable diaphragm which is secured around its perimeter. A central portion of the diaphragm is oscillated, by a piston-driven hydraulic system, for example, between a convex and a concave configuration to thereby pull the paint toward the diaphragm and hence force it outwardly to the spray gun.

In another format, a rotating eccentric cam drives a bearing which in turn drives a piston. The piston is coupled to the diaphragm and the rotation of the cam drives the piston to thereby move the diaphragm to and between the convex and concave configurations. The paint is drawn from the can through the suction tube and inlet valve toward the diaphragm and into the diaphragm chamber to be discharged through the spray gun.

Despite past efforts, the use of such systems for spraying paint, for example, have been subject to inconsistent results and unexplained, undesirable variations. For example, on a given day, a system may not work well with one paint, failing to fully atomize it and "spattering" it onto a surface while operating efficiently with the same paint at another time or in another location.

Other problems which are commonly identified in such airless paint sprayers include ineffective spraying of paint of a first type but efficient spraying of paint of a second type. Several possible causes of problems of this type have been proposed such as lack of consistent priming, paint buildup, clogged filters, paint viscosity, humidity, etc. However, these problems occur even when a problem paint is thinned to the general consistency of water, the filters are clean, or the flow path of the paint unclogged. These symptoms can even be apparent in using one paint while not in using another even though the paints have similar viscosities.

Accordingly, the effective and consistent use of an airless paint system appears to be a sometimes thing dependent on a variation of parameters, ever changing.

Therefore, it is apparent that there is a need for an airless paint sprayer which does not exhibit a loss of pressure while spraying and can reliably, efficiently and effectively spray all types of paint at a wide range of operating conditions without the above identified problems and inconsistencies.

It has thus been a primary objective of this invention to provide an improved airless paint sprayer which does not loose pressure while spraying.

It has been a further objective of this invention to provide such a paint sprayer which can be efficiently and effectively used with a variety of paint types without loosing pressure while spraying.

It has been a still further objective of this invention to provide such a paint sprayer which can be used with a variety of paints and paint viscosities to consistently atomize and spray the paint in a desired homogeneous pattern.

SUMMARY OF THE INVENTION

To these ends, a preferred embodiment of the invention contemplates the use of a dampener on the spray liquid or paint intake side of the paint sprayer. In a still further preferred embodiment, a dual spring inlet check valve is used in the inlet of the paint in conjunction with the dampener.

One aspect of the invention is the realization of the basic problem which is responsible for inconsistent paint spraying performance. According to the invention, that problem is the inconsistency of the system by which paint is delivered from an open container to the pumping or diaphragm chamber of the spraying apparatus.

Typically the suction tube between the inlet check valve of the pumping chamber and the open paint container is vertically oriented and may be 1 to 2 feet long. Paint is sucked up from the container in this tube, through the inlet check valve and into the pumping chamber. In order to suck the paint past the inlet check valve the diaphragm must create a pressure drop in the chamber and it does so by virtue of its eccentric drive or by the piston-driven hydraulic drive. The nature of the diaphragm is cyclical; the diaphragm constantly accelerating and decelerating through each sucking and pumping direction.

For example, as the diaphragm is moved to enlarge the chamber for sucking paint up the supply tube, it accelerates due to the eccentric action of the piston. It decelerates as it reaches its maximum stroke and the check valve closes. During this time, the paint in the tube is subjected to a pressure drop which first accelerates then decelerates to near equilibrium when the inlet check valve closes. Thereafter, the diaphragm is accelerated into the chamber to pump out the paint therein. Once this stroke ends, the diaphragm accelerates in a reverse direction to again open the inlet check valve and suck paint up from the tube. Thus, the eccentric rotation of the cam drive and the acceleration/deceleration of the rod following the cam create acceleration spikes in the flow of the paint during each cycle. The acceleration spikes correspond to specific points or areas on the drive cam which result in significant acceleration/deceleration of the rod. These acceleration/deceleration forces are transferred from the rod to the diaphragm thereby resulting in acceleration spikes in the flow of the paint drawn into the diaphragm chamber through the inlet check valve and suction tube. The paint is thus being accelerated and decelerated with each stroke of the diaphragm. This invention is based, in part, upon the realization that the force required to accelerate the paint was in many instances greater than the paint itself could support without cavitation or boiling.

Accordingly, it has been discovered that the paint was cavitating or boiling in the diaphragm chamber in many instances due to the sum of the various forces to which the paint is subjected. Factors which contribute to paint cavitation in such paint sprayers are the ambient temperature and barometric atmospheric pressure (i.e., altitude) at which the sprayer was operated. Other factors which may contribute are the dimensions, configurations and tolerances of the suction tube, and the viscosity of the paint. Thus, under specific conditions, it has now been discovered that the force required to overcome the inertia of the paint and accelerate it through the system was greater than the paint could support. This resulted in the cavitation or boiling of some of the liquids in the paint, and the resulting interruption of full paint flow through the sprayer, a loss of pressure while spraying, and inconsistent spraying results, such as "spattering" and inconsistent atomization.

Accordingly, the dampener of one embodiment of the present invention comprises a generally T-shaped fitting connected to the suction tube leading to the inlet check valve of the pump or diaphragm chamber. The T-shaped fitting includes a first leg having a port through which paint is received from the suction tube inserted in the paint can or reservoir and a second leg perpendicular to the first leg through which paint is discharged via a second port to the inlet check valve of the pump. A third leg of the T-fitting comprises a closed chamber which is in line with the first leg and perpendicular to the second leg in a presently preferred embodiment of the invention. Other configurations of the dampener for different sprayer configurations are possible and within the scope of this invention.

The above aspect of this invention solves a significant number of occurrences of the problem of pressure loss during the operation of the paint sprayer caused, in part, by acceleration spikes transmitted in the paint. This is initially accomplished with the T-shaped fitting positioned in-line on the suction tube on the intake side of the inlet check valve. The air trapped in one of the legs of the T-fitting dampens the acceleration spikes to thereby even the flow of the paint. While the paint in the discharge or second leg of the T-fitting is still subjected to some of the acceleration spikes and the acceleration/deceleration forces, the volume of paint which remains on the intake side or of the first leg of the T-fitting is isolated from the acceleration spikes.

More particularly, according to the invention, a dampening chamber such as the T-fitting described is operatively connected to the paint supply path upstream of the inlet check valve. On start up, the pump is primed normally, however it will be appreciated a slight negative pressure is created in the dampening chamber. On operation, when the diaphragm is pushed into the pumping chamber and the inlet check valve is closed, the pressure drop on the supply side of the inlet check valve is reduced. The slight negative pressure in the dampening chamber pulls an amount of paint therein.

When the diaphragm starts its reciprocal motion and begins to accelerate, the inlet check valve is open. As the pressure drop increases in magnitude, the suction on the paint supply increases to a peak. However, according to the invention, not only is the paint in the suction tube subjected to this drop, but the paint in the dampening chamber is sufficient to feed the increased paint demand. The intake paint is thus made up not only of paint from the supply can and in the tube above it, but also paint in the dampening chamber.

During operation, the pressure in the dampening chamber is greater than the pressure in the supply side of the fitting connected to the inlet check valve. As a result, the paint at the higher pressure in the dampening chamber feeds the supply side of the fitting during extreme acceleration of the diaphragm. Thus, the acceleration spikes applied to the supply side paint are reduced and are not excessive enough to cause the paint to cavitate and incompletely fill the pumping chamber.

Thereafter, on a pressure stroke, the pumping chamber is full and design pressure drop at the spray orifice is maintained sufficiently to support consistent atomization and paint spray performance. At the same time, closure of the inlet check valve allowed the now slight negative pressure in the dampening chamber to suck up a small amount of make-up paint from the suction tube in readiness for another dampening cycle.

The dampener of this invention thus solves a significant number of the problems identified hereinabove with airless diaphragm paint sprayers. With the inclusion of the dampener of this invention, the even flow of the paint from the tube to the spray gun without cavitation, loss of pressure, or other problems associated with airless diaphragm paint sprayers is attained.

The inlet check valve spring of this invention also solves a large number of occurrences of paint cavitation and loss of pressure in paint spray, and very often more occurrences than the dampener fitting previously described. Prior to this invention, only about 10–15% of the maximum paint flow was passing through the paint sprayer due to the cavitation of the paint. For example, a paint sprayer pump capable of operating at a peak flow of about 1.2 gallons per minute (gpm) was only operating at approximately 0.14 to 0.19 gpm flow. It was discovered that if the travel or distance which the inlet check valve moved to permit the paint to flow from the inlet suction tube through the inlet check valve to the diaphragm chamber was increased, then the volumetric flow of the paint without cavitation could also be increased.

Increasing the travel of the inlet check valve introduced other problems. When the travel of the inlet check valve is increased, the response time of the valve drops below a minimal acceptable level. The response time of the valve is the time for the valve to return from an open configuration to a closed position. One way to increase the response time of the valve and maintain a longer travel distance was to increase the return spring preload or spring rate. However, increasing the spring preload or rate adversely effects the vacuum and priming operations of the pump.

One way to increase the spring preload is to utilize a spring with a higher spring rate (i.e., a spring which requires more force for the same amount of deflection). However, sensitivity to valve and component wear increases when utilizing a spring with a sufficiently high spring rate to maintain a sufficient response time for the system while providing increased inlet travel distance to avoid paint cavitation.

The inlet check valve spring of the present invention was discovered by taking into consideration the altitude, temperature, and pressure conditions that might occur at any given operating location, and the boiling points of the paints and/or fluids to be pumped. At maximum likely operating elevations, barometric pressures and temperatures, the pressure drop across various components of the airless paint sprayer and the total intake system were used to calculate the maximum pressure drop across the inlet check valve without paint cavitation. For example, in one presently preferred embodiment of an airless paint sprayer, a pressure drop of approximately 3.5 psi across the inlet check valve without cavitation is possible with a minimum design pressure of 10 psi absolute.

The inlet check valve of the present invention includes dual springs which in combination provide for maximum travel of the inlet check valve to avoid cavitation, sufficient response time of the inlet check valve to maintain system performance without increased wear or dimensional variation on the valve components. The inlet check valve spring assembly includes a primary spring having a very low spring rate, approximately 1 lbf/in (one pound force per inch) in a presently preferred embodiment, and a secondary spring having a much higher spring rate, approximately 6 lbf/in in a preferred embodiment. The primary spring is always engaged with the inlet check valve and reduces sensitivity to valve wear and dimensional variation because it has a low spring rate. The secondary spring, depending upon tolerance conditions, can be either nominally preloaded or disengaged from the valve when not in operation. If the secondary spring is engaged due to tolerance conditions, the combined preload of the secondary and primary springs does not exceed that of current single spring inlet check valve designs. As a result, the dual inlet check valve spring can be used in products currently available with a conventional single spring without detriment to the vacuum or priming operation.

The secondary spring permits an increased response time of the valve due to the higher spring rate. The primary spring maintains a low preload during priming operations. The secondary spring provides little, if any, preload during priming operations, but provides the majority if not all of the preload during normal operation. The dual spring of the inlet check valve of this invention avoids the cavitation of the paint and the problems associated therewith in an airless sprayer by permitting greater fluid flow through the inlet check valve. The dual spring facilitates the greater flow without the disadvantages of reduced response time, increased sensitivity to component wear and loss of priming performance.

The dampener and inlet check valve spring of this invention solve most, if not all, the problems identified hereinabove with airless diaphragm paint sprayers. With the inclusion of the T-fitting dampener and inlet check valve spring of this invention, the even flow of the paint from the tube to the spray gun without cavitation, loss of pressure, or other problems associated with airless diaphragm paint sprayers is attained.

BRIEF DESCRIPTION OF THE FIGURES

The objectives and features of this invention will become more readily apparent from the following detailed description taken in conjunction with the accompanying drawings in which.

DETAILED DESCRIPTION OF THE INVENTION

Figure 1:
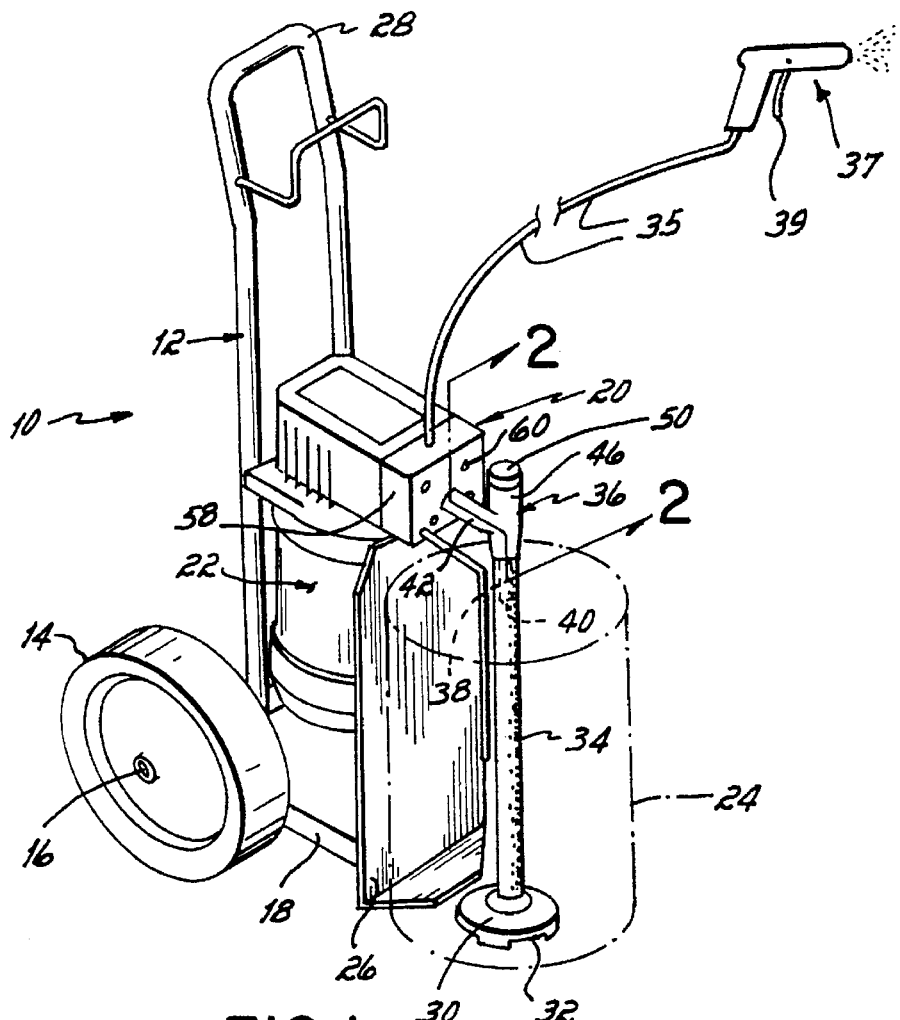
FIG. 1 is a perspective view of an airless paint sprayer according to the invention.

An airless paint sprayer 10 as shown in FIG. 1 includes a mobile hand cart 12 supported on the ground by wheels 14 mounted upon an axle 16 for rotation. The hand cart 12 includes a frame 18 to support a pump 20 and a motor 22 which draws paint from a can 24 or other receptacle mounted on a generally L-shaped carriage 26 secured to a lower portion of the frame 18. The paint sprayer 10 can be moved about by grasping an upper generally U-shaped handle 28 and tilting the unit backwards to thereby raise the carriage 26 and paint can 24 supported thereon upwardly to balance the sprayer 10 upon the wheels 14. Other structure of carrying the pump and motor 20, 22 and for supporting them over a paint container or spray liquid container can be used.

In operation, the paint is drawn from the can 24 through a generally cup-shaped intake 30 having a plurality of cut-outs 32 through which the paint enters the intake 30 supported on a bottom wall of the can 24. The paint is drawn from the can 24 through the intake 30 and into a suction tube 34. The paint flows through the suction tube 34 and into the pump 20 for pressurized delivery to a supply line 35 and spray gun 37 through which the pressurized paint is sprayed out of the spray gun in the direction of a surface to be coated. The route of the paint from the can 24 through the pump 20 is identified as a paint path P in FIG. 2.

Figure 2:
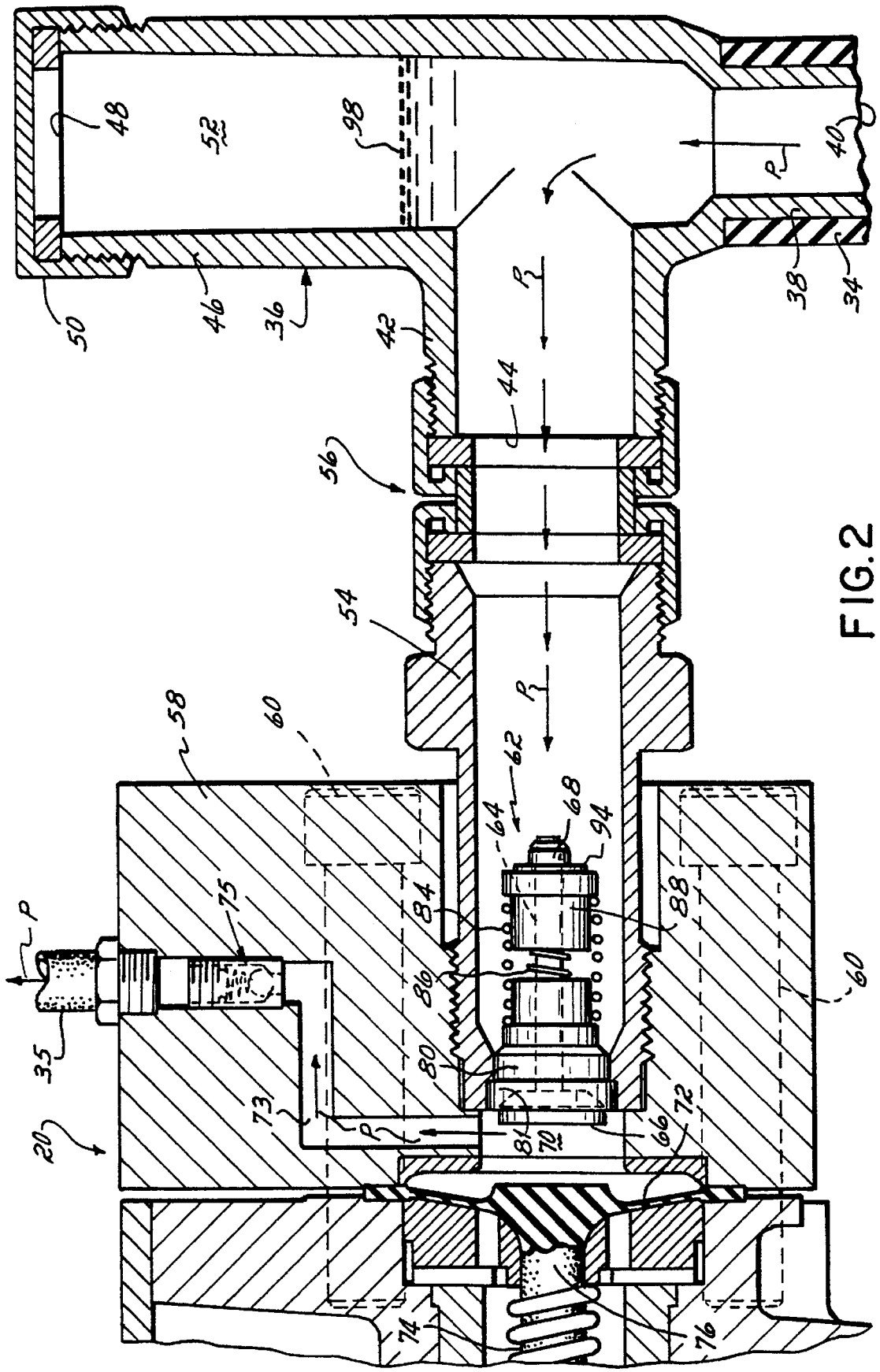
FIG. 2 is a cross-sectional view along line 2—2 of FIG. 1 of the T-shaped dampener fitting and inlet check valve according to this invention.

Attached to the upper end of the suction tube 34 is a generally T-shaped fitting 36. The T-shaped fitting 36 in one embodiment includes a first leg 38 which is inserted into the upper end of the suction tube 34 as shown in FIG. 2 and a first port 40 through which the paint is drawn from the suction tube 34. A second leg 42 of the T-shaped fitting 36 is generally perpendicular to the first leg 38 and includes a second port 44 through which the paint exits the fitting 36. Perpendicular to the second leg 42 and generally in line with the first leg 38 of the fitting 36 is a third leg 46 which extends upwardly and includes a third port 48. The third port 48 is closed by a cap 50 which is secured on an upper end of the third leg 46 by inter-engaging threads on the cap 50 and an outer surface of the third leg 46 or another appropriate fastening mechanism. The cap 50 secured to the third leg 46 closes the third port 48 and defines a volume or dampening chamber 52 within the third leg 46.

In a presently preferred embodiment of the T-shaped fitting 36, the first leg 38 is approximately one inch in length and the first port 40 has an inner diameter of about 0.48 inches. The second leg 42 is approximately 2.1 inches in length as measured from the centerline of the first leg 38 and the second port 44 has an inner diameter of 0.78 inches. The third leg 46 is approximately 2.1 inches in length as measured from the centerline of the second leg 42 and the third port 48 has an inner diameter of approximately 0.9 inches. The T-shaped fitting 36 is preferably manufactured from 10% glass-filled nylon.

The second leg 42 of the T-shaped fitting 36 is connected to an inlet valve cartridge 54 by a coupling 56 or other appropriate mechanism as known in the art. The inlet valve cartridge 54 is mounted to a pump housing 58 of the pump 20. The housing 58 is secured to the pump 20 as shown in FIG. 2 by bolts 60 or other mechanical fasteners. Seated within an end of the inlet valve cartridge 54 and mounted in the housing 58 is an inlet check valve assembly 62 which includes an elongated valve stem 64 projecting axially within the inlet valve cartridge 54, and having a disk-shaped valve head 66 secured on one end opposite from another end 68 thereof. The inlet check valve assembly 62 translates between open and closed positions to permit the flow of paint through the inlet valve cartridge 54 to the hose 35 and spray gun upon actuation by a trigger 39 or other appropriate mechanism as is well known by those of ordinary skill in the art.

The valve head 66 is positioned proximate a diaphragm chamber or pumping chamber 70 and is spaced from a deformable diaphragm 72. The diaphragm 72 is secured around its perimeter so that a central portion of the diaphragm 72 can oscillate between convex and concave configurations. As it is pulled to the left as viewed in FIG. 2, it pulls the paint through the inlet valve cartridge 54 and the open inlet check valve assembly 62 toward the diaphragm 72. As it moves to the right, it pressurizes chamber 70 and pumps paint through an outlet 73 having a check valve 75 and to the spray tube 35 and spray gun 37. The deformable diaphragm 72 has a stem 74 secured to a central portion 76. The stem 74 is driven indirectly from a piston and eccentric cam (not shown) as is well known in airless paint sprayers of the type described above.

Figure 3:
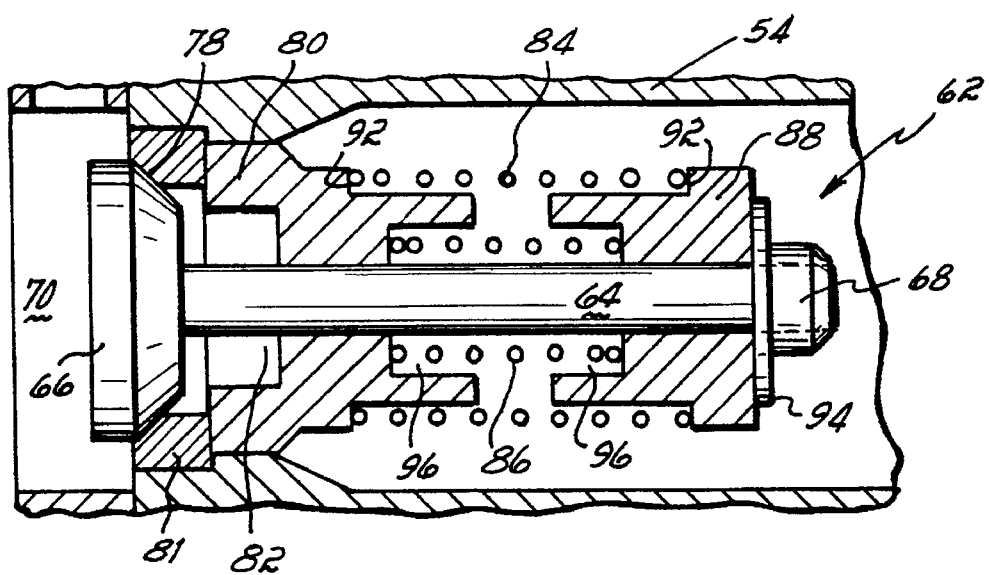
FIG. 3 is an enlarged cross-sectional view of the dual spring inlet check valve assembly of FIG. 2.

As best seen in FIG. 3, the inlet check valve assembly 62 is biased to a closed position in which the valve head 66 is in sealing contact with a surface 78 of an annular seat 81. The seat 81 is juxtaposed to a limiter 80. The inlet check valve assembly 62 is shown in FIGS. 2 and 3 in the closed position with the valve head 66 in contact with the surface 78 of the seat 81. The valve stem 64 projects through a hole 82 in the center of the limiter 80. The valve 62 is biased toward the closed position by a pair of nested helical compression springs 84, 86 according to a presently preferred embodiment of this invention. The outer, primary spring 84 is mounted between the limiter 80 and an opposing retainer 88. The end coils of the primary spring 84 are seated on flanges 92 on the retainer 88 and on the limiter 80 as shown in FIG. 3. The retainer 88 is juxtaposed to an annular push-on retainer 94 proximate the end 68 of the valve stem 64. The primary spring 84 is preloaded to a partially compressed configuration thereby urging the retainer 88 and the limiter 80 apart and biasing the valve stem 64 into a closed configuration with the valve head 66 in sealing contact with the surface 78 on the seat 80.

Figure 3A:
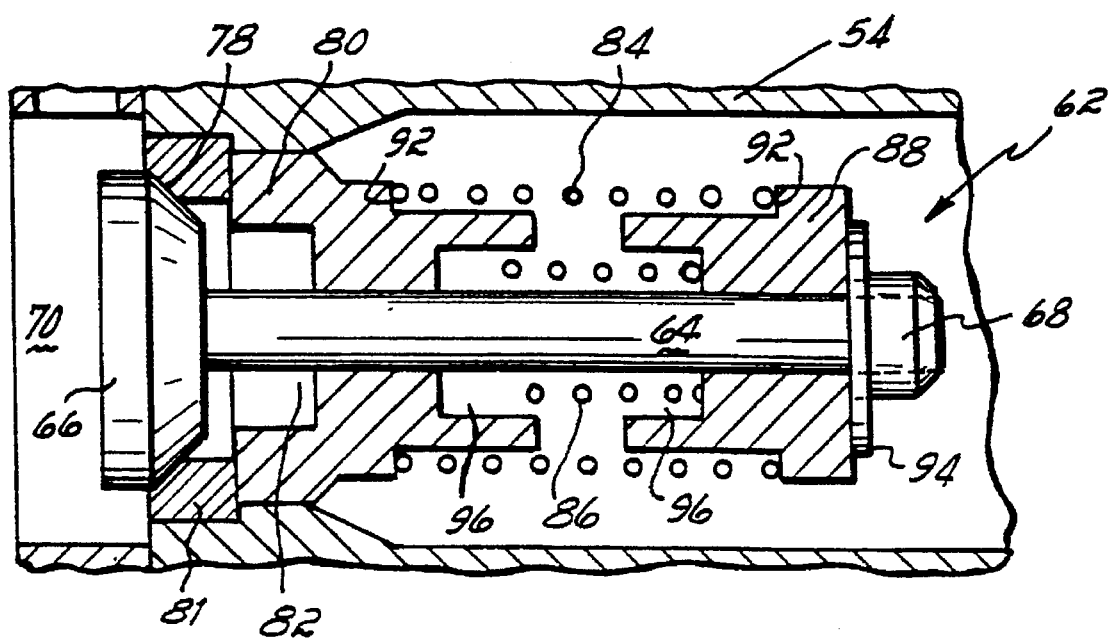

The secondary spring 86 is nested within the primary spring 84 and around the valve stem 64. The secondary spring 86 is seated within sockets 96 formed within the centers of the retainer 88 and the limiter 80 as shown in FIG. 3. According to this invention, the secondary spring 86 may contribute to the preload of the valve 64 in the closed configuration or the secondary spring 86 may be offset within the sockets 96 from either or both of the retainer 88 and the limiter 80 so that it is not compressed while the valve stem 64 is in the closed configuration (FIG. 3A).

According to a presently preferred embodiment of this invention, the primary spring 84 has a relatively low spring rate and the secondary spring 86 has a significantly larger spring rate. In one embodiment of an airless paint sprayer 10 according to this invention, the primary spring 84 has a rate of approximately 1 lbf/in and the secondary spring 86 has a rate of 6 lbf/in. The primary spring 84 maintains engagement with both the retainer 88 and the limiter 80 and thereby remains in at least a partially compressed configuration. The relatively low spring rate of the primary spring 84 reduces sensitivity to valve wear and dimensional variation of the inlet check valve assembly 62 components. With the valve 64 in the closed position, the secondary spring 86, depending on tolerance conditions, can range from being preloaded at approximately 0.01 inches of deflection to 0.20 inches of freedom in one particular embodiment of this invention. If the secondary spring 86 is engaged in the closed position, the combined preload of the primary and secondary springs 84, 86 should not exceed that of standard single spring inlet check valve assembly designs. As a result, the inlet check valve assembly 62 according to this invention can be used in many standard airless paint sprayers without detriment to the system, vacuum or priming operations.

During operation of the airless paint sprayer 10, the deformable diaphragm 72 operates to draw paint into the diaphragm chamber 70 with the inlet check valve assembly 62 open and the head 66 spaced from the surface 78 of the limiter 80. In the open configuration, the primary and secondary springs 84, 86 are compressed and the retainer 88 and the limiter 80 are drawn closer together as a result of the travel or movement of the valve stem 64 so that the valve head 66 is spaced from the surface 78. The primary and secondary springs 84, 86 of the inlet check valve assembly 62 according to this invention enable the valve travel distance to be increased relative to known single spring inlet check valve assemblies. The increased travel of the valve head 66 enables greater fluid flow through the valve 62 without cavitation or boiling of the paint over a wide range of operating conditions, barometric pressures, ambient temperatures, and altitudes.

Specifically, for a pump having a peak flow of 1.2 gpm, the maximum fluid flow that can be achieved was raised from about 0.14–0.19 gpm to 0.85–1.14 gpm with the increased travel distance of the valve and the dual spring assembly. This increased allowable fluid flow was achieved due to the increased travel distance of the valve. However, when the valve travel distance is increased, the response time of the valve must be maintained so that the operating performance of the paint sprayer 10 is not diminished. The response time as used herein refers to the elapsed time for the inlet check valve 62 to move between opened and closed positions. Preferably, the inlet check valve 62 should have a response faster than 30 Hz in one preferred embodiment of the airless paint sprayer 10 according to this invention.

The dual spring inlet check valve assembly 62 according to this invention maintains a relatively low preload upon the valve stem 64 in the closed configuration and while priming the system and a much higher load when the valve 62 is in the open position. In one preferred embodiment of an airless paint sprayer according to this invention, the optimum combined spring preload for the inlet check valve assembly 62 with a maximum inlet check valve head 66 travel distance is approximately 0.83 pounds. This value will change based upon valve size, component geometry, maximum travel distance, and other paint sprayer parameters. The optimum preload force upon the valve in the closed position is approximately 0.13 pounds.

As a result of the dual spring inlet check valve assembly 62 according to this invention, the travel distance of the valve head 66 can be increased to thereby allow greater fluid flow through the inlet check valve 62 without cavitation of the paint while still maintaining an appropriate response time for the inlet check valve and minimizing the detrimental effects of component wear, diminished priming and vacuum performance of the system.

In addition to the inlet check valve assembly 62 according to this invention, the T-shaped fitting 36 contributes to reducing cavitation in the paint by dampening the acceleration spikes transmitted in the fluid from the deformable diaphragm 72. After the paint sprayer 10 has been primed and during operation, the paint level in the third leg 46 of the T-shaped fitting 36 is indicated by reference numeral 98. The chamber 52 in the third leg 46 contains a trapped volume of air, preferably at a partial vacuum of greater than about 1.0 in-Hg and approximately 3.0 in-Hg in one preferred embodiment. The air trapped within the chamber 52 in the third leg 46 of the T-shaped fitting 36 dampens the acceleration spikes being transmitted from the diaphragm 72 through the paint in the inlet valve cartridge 54 and second leg 42 of the T-shaped fitting 36 to thereby even the flow of the paint. While the paint in the discharge or second leg 42 of the T-shaped fitting 36 may be subjected to some of the acceleration spikes and acceleration/deceleration forces generated by the deformable diaphragm 72, the volume of paint which remains on the intake side of the T-shaped fitting 36 or the first leg 38 is isolated from the acceleration spikes. The volume of paint within the chamber 52 in the third leg 46 is drawn into the second leg 42 along with paint from the suction tube 34 and first leg 38 while the inlet check valve 62 is open and drawing paint therethrough. The added supply of paint from the chamber 52 overcomes the acceleration spikes and inhibits cavitation in the paint path P. Therefore, the paint does not cavitate, boil, or breakdown thereby avoiding a significant number of occurrences of pressure loss in the paint sprayer 10 and other problems previously associated with airless diaphragm paint sprayers.

As a result of the T-shaped fitting 36 which dampens acceleration spikes and acceleration/deceleration forces transmitted in the paint and the dual spring inlet check valve assembly 62 which permits increased fluid flow through the inlet check valve, most, if not all, of the problems of cavitation and loss of pressure in airless paint sprayers 10 are corrected without major paint sprayer redesign or other system changes.

It will be appreciated that although the dampener and dual spring inlet check valve assemblies are shown and described herein, that either feature can be used alone to inhibit paint cavitation in the paint path of the airless sprayer. Each of these features and inventions independently contribute to solving the above described problems and should not be considered to be mutually dependant upon each other to attain the goals and objectives of this invention. Furthermore, use of the dampener and dual spring inlet check valve inventions in combination provide greater advantages by avoiding the most of the problems of cavitation than use of either invention individually.

From the above disclosure of the general principles of the present invention and a preceding detailed description of a preferred embodiment, those skilled in the art will readily comprehend the various modifications to which the present invention is susceptible. For example, the invention has been shown and described herein with reference to a paint sprayer, but could readily be used in other systems. Therefore, I desire to be limited only by the scope of the following claims and equivalents thereof.

I claim:

1. A sprayer for spraying a fluid from a receptacle comprising:
    a suction tube having a first end inserted into the fluid within the receptacle;
    a fitting having a first and second port and a chamber, said first port being operatively connected to a second end of said suction tube, fluid flowing from the receptacle through said suction tube and into said fitting being discharged through said second port of said fitting, said chamber being interconnected with said first and second ports and being positioned proximate an intersection of the respective axes of said first and second ports to inhibit cavitation of the fluid flowing through the second port;
    a diaphragm pump having an inlet check valve operatively connected to said second port of said fitting; and
    a nozzle operatively connected to said pump such that during operation of the sprayer said pump draws the fluid from the receptacle through said suction tube and said fitting and pumps the fluid to said nozzle for spraying;
    said chamber of said fitting having a volume of air contained therein to inhibit cavitation of the fluid flowing from the receptacle through said fitting and to the pump;
    said inlet check valve regulating flow of said fluid into said pump and being biased toward a closed position by first and second springs, said first spring engaging said inlet check valve in said closed position and said second spring only engaging said inlet check valve when in an open position to bias said inlet check valve toward said closed position, said first and second springs in combination enabling said inlet check valve sufficient travel distance between said open and closed positions to inhibit cavitation of the fluid flowing through said inlet check valve without diminishing response time of said inlet check valve.

2. The sprayer of claim 1 wherein said fitting is T-shaped with a first leg of said T-fitting including said first port, a second leg of said T-fitting including said second port, and a third leg of said T-fitting including said chamber, said first and third legs being generally collinear and said second leg being generally perpendicular to said first and third legs.

3. The sprayer of claim 1 wherein said second spring has a spring rate greater than a spring rate of said first spring.

4. The sprayer of claim 1 wherein said first and second springs are each spiral compression springs.

5. The sprayer of claim 1 wherein said second spring is nested within said first spring and said first and second springs have a common axis.

6. The sprayer of claim 1 wherein said first spring biases said inlet check valve in said open and closed positions and intermediate positions between said open and closed positions.

7. A sprayer for spraying a fluid from a receptacle comprising:
    a suction tube having a first end inserted into the fluid within the receptacle;
    a fitting having a first and second port and a chamber, said first port being operatively connected to a second end of said suction tube, fluid flowing from the receptacle through said suction tube and into said fitting being discharged through said second port of said fitting, said chamber being interconnected with said first and second ports and being positioned proximate an intersection of the respective axes of said first and second ports to inhibit cavitation of the fluid flowing through the second port;
    a pump having an inlet check valve operatively connected to said second port of said fitting; and
    a nozzle operatively connected to said pump such that during operation of the sprayer said pump draws the fluid from the receptacle through said suction tube and said fitting and pumps the fluid to said nozzle for spraying;
    said chamber of said fitting having a volume of air contained therein to inhibit cavitation of the fluid flowing from the receptacle through said fitting and to the pump;
    said inlet check valve regulating flow of said fluid into said pump and being biased toward a closed position by first and second springs, said first spring engaging said inlet check valve in said closed position and said second spring only engaging said inlet check valve when in an open position to bias said inlet check valve toward said closed position, said first and second springs in combination enabling said inlet check valve sufficient travel distance between said open and closed positions to inhibit cavitation of the fluid flowing through said inlet check valve without diminishing response time of said inlet check valve.

8. A method of spraying paint with an airless diaphragm pump paint sprayer, the method comprising the steps of:

suctioning the paint from a paint source through a supply tube to an inlet check valve having first and second springs;

opening the inlet check valve by compressing only the first spring of the inlet check valve;

priming the diaphragm pump when the inlet check valve is open, wherein the second spring is not compressed by inlet check valve during the initial opening of the inlet check valve and the priming of the diaphragm pump;

pumping the paint to a spray gun;

spraying the paint with the spray gun;

dampening pressure drops generated by the diaphragm pump and transmitted in the paint to inhibit cavitation of the paint, the dampening being accomplished by a chamber of trapped air in communication with the supply tube between the paint source and the inlet check valve; and closing the inlet check valve with both the first and second springs, the first and second springs combining to close the inlet check valve with a response time sufficient to prevent leakage of the paint from the spray gun after completion of the spraying while providing a sufficient travel distance of the inlet check valve when open to inhibit paint cavitation.

9. The method of claim 8 wherein a portion of the paint in the supply tube proximate the chamber of trapped air is drawn into the inlet check valve when the inlet check valve is open.

* * * * *